United States Patent [19]

Honjo

[11] 4,123,780
[45] Oct. 31, 1978

[54] SIGNAL NOISE FILTRATION FOR LASER BEAM RECORDING SYSTEM

[75] Inventor: Yoshihiko Honjo, Ayase, Japan

[73] Assignee: Victor Company of Japan, Limited, Yokohama, Japan

[21] Appl. No.: 753,003

[22] Filed: Dec. 21, 1976

[30] Foreign Application Priority Data

Dec. 22, 1975 [JP] Japan .................................. 50-152000
Dec. 22, 1975 [JP] Japan .................................. 50-152001

[51] Int. Cl.$^2$ ........................... H04N 5/76; G11B 7/12
[52] U.S. Cl. ........................ 358/128; 179/100.3 GN; 179/100.3 P; 179/100.3 V; 346/76 L; 346/108
[58] Field of Search ............. 179/100.3 V, 100.3 GN, 179/100.3 P, 100.3 N; 358/128; 346/108, 76 L

[56] References Cited

U.S. PATENT DOCUMENTS

| | | | |
|---|---|---|---|
| 2,297,450 | 9/1942 | Becker | 179/100.3 N |
| 3,654,624 | 4/1972 | Becker et al. | 340/173 LM |

*Primary Examiner*—Raymond F. Cardillo, Jr.

[57] ABSTRACT

The invention provides a system for optically recording information on a recording medium. A light source emits a laser light beam and an optical system, including a lens, focuses the laser beam spot on the recording medium. The light intensity of the laser beam is modulated responsive to an information signal. The light modulator is in a path between the light source and the optical system. A noise component is detected in the laser light beam passing through the light path and removed therefrom. The optical system records the information on the recording medium by the laser light beam, in which the noise component has been removed, and on which the information has been applied by the light modulator.

10 Claims, 8 Drawing Figures

4,123,780

SIGNAL NOISE FILTRATION FOR LASER BEAM RECORDING SYSTEM

BACKGROUND OF THE INVENTION

The present invention relates generally to systems for optically recording information on a recording medium and more particularly to systems for optically recording information signal on a disc by means of laser light from which noise has been effectively removed.

A system using laser beams for optically recording information, such as video signals, on a recording disc has been known. Laser noise is unavoidably included in a laser light beam from a laser light source for a number of various causes. Furthermore, one kind of noise component in a laser light beam is a drift component due to various causes, such as fluctuations in the power supply for the laser light source.

This noise is generated not only in the laser light source, but also in the laser light path. For example, in order to apply information onto a laser beam, a light modulator is used to modulate the light intensity of the beam in response to the information signal. This light modulator, also, drifts due to causes such as temperature variation. The drift becomes admixed with the laser light beam passing through the light modulator.

If the information is recorded by means of a laser light containing noise, as described above, the noise will also be recorded. Consequently, there is a small S/N ratio of a signal reproduced from a disc recorded in this manner.

On the other hand, as the recording laser light beam moves progressively from the outer periphery toward the center of the recording disc, there is a decrease in the relative linear speed between the recording light beam and the recording disc. In order to maintain a constant average energy of the laser light beam, per unit area to the recording disc surface, despite this decrease in relative linear speed, it is necessary to gradually decrease the intensity of the laser light beam. A control of this kind is generally called a "radial compensation".

In carrying out radial compensation, heretofore, a variable light attenuator uses an optical filter. In this known method, however, problems have been encountered, such as a shifting of the light axis and a loss in light due to dust collecting on the optical filter.

SUMMARY OF THE INVENTION

Accordingly, a general object of the present invention is to provide a novel and useful optical recording system for recording on a recording medium, which has overcome the above described problems.

Another and specific object of the invention is to provide a system for optically recording on a recording medium by means of a laser light beam from which noise has been effectively removed.

Still another object of the invention is to provide a system which is capable of optically recording with a laser light beam from which both a high frequency noise component and a of low frequency drift component has been effectively removed.

A further object of the invention is to provide a system for optically recording on a recording medium by removal of the noise components and, at the same time, effectively carrying out a radial compensation.

Further objects and features of the present invention will be apparent from the following detailed description when read in conjunction with the accompanying drawings.

DETAILED DESCRIPTION

Figure 1:
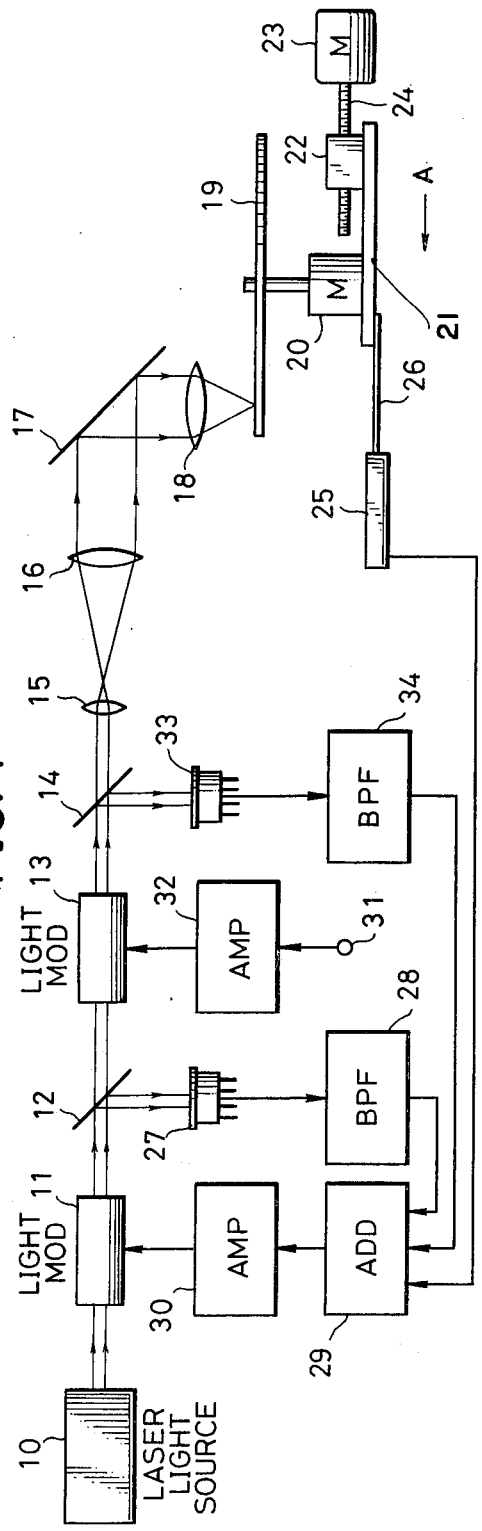
FIG. 1 is a schematic optical and electrical diagram of a first embodiment of the optical recording system according to the present invention.

A first embodiment of the optical recording system of the present invention will now be described with reference to FIG. 1. A laser light beam emitted from an argon laser light source 10 passes through a light modulator 11. For example, an electro-optic type light modulator may be employed as the light modulator 11. The light modulator of this type is well known and includes a material having double refractiveness. A variable voltage changes a deflecting plane of the passing light, a polarizer allows passage of a light having a specific deflecting plane.

The laser light beam passed through the light modulator 11, on one hand, passes through a half-mirror 12 and is projected as incident light into a light modulator 13. On the other hand, the light is reflected by the half-mirror 12 and projected to a light detector 27 comprising a photo-diode. An information signal, such as video signal, may have a frequency range extending, for example, from 200 KHz to 12 MHz as indicated by a curve I in FIG. 2. The information signal is applied at an input terminal 31 to the light modulator 13, via an amplifier 32. The light intensity of the laser light beam is modulated in the light modulator 13 in response to the information signal supplied from the amplifier 32. Accordingly, the laser light beam emitted from the light modulator 13 has an information signal component.

The laser light beam from the modulator 13 passes through a half-mirror 14 and is also projected into a lens 15. The portion of this laser light beam which is reflected by the half-mirror 14 is projected to a light detector 33 comprising a photo-diode. The laser light beam passing through the lens 15 is converted into a large diameter, parallel-ray laser light beam, by a lens 16. The lenses 15 and 16 constitute a "expander" which converts a light beam having a small diameter into a light beam having a large diameter. The light of the laser beam passing through the lens 16 is reflected by a mirror 17 and focused in a spot on a surface of a recording disc 19, by an objective lens 18.

The surface of recording disc 19 has a photo resist coating which is sensitive to the 4597 A wave length of the argon laser light. This photo resist is exposed by the laser light from the lens 18. Then, it is sensitized responsive to the information signal component, whereby a recording is made on the recording disc 19. The recording disc 19 is rotated at a constant speed by a motor 20 fixed to a movable surface plate 21. A nut member 22 is fixed to the surface plate 21 to receive a feed screw 24 which is rotated by a motor 23, acting through a speed reduction mechanism. The recording disc 19 is moved in a direction indicated by an arrow A, together with the surface plate 21 and the motor 20. The rate of movement is in accordance with the pitches of the feed screw 24 and the nut 22, and with rotational speed of the motor 23. Since the recording disc 19 is simultaneously rotated by the motor 20 and moved in the arrow A direction by the motor 23, the laser light focused by the lens 18 scans a spiral rack on the recording disc 19, with movement from the outer peripheral side to the center of the disc Thus, the information signal is recorded in a spiral track.

A rod 26 is fixed to the surface plate 21 and moves in the arrow A direction with the surface plate 21. A slider of a variable resistor 25, fixed to a chassis, is slid by the rod 26. The variable resistor 25 produces a variable voltage control signal which decreases as a function of the radial position of the laser light beam spot focused on the recording disc 19. The variable control voltage signal is used as a radial compensation signal, as described hereinafter.

The light detector 27 converts the laser light beam from the half-mirror 12 into a current signal having a value which corresponds to the light intensity. The signal from the light detector 27 is supplied to a band-pass filter 28. A signal having a predetermined frequency range which has passed through the band-pass filter 28 is inverted and supplied to an adder 29. The light detector 33 converts the laser light beam from the half-mirror 14 into an electric current signal and supplied to a band-pass filter 34. A signal having another predetermined frequency range passing through the band-pass filter 34 is also inverted and supplied to the adder 29.

Figure 2:
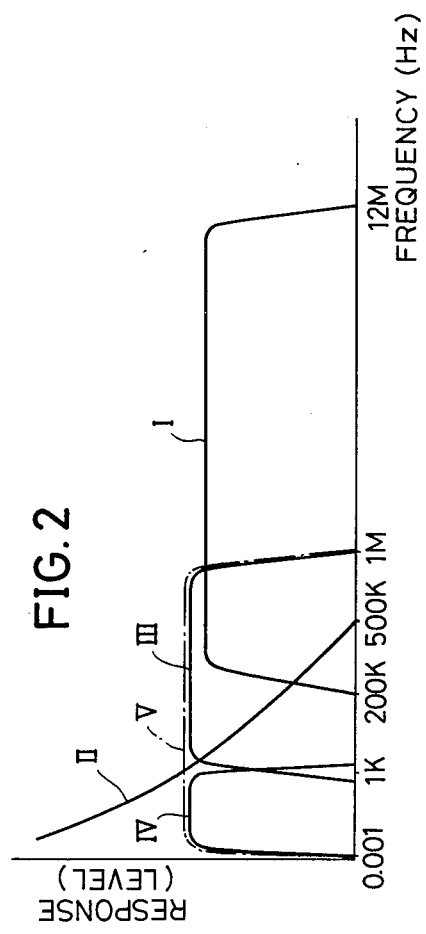
FIG. 2 is a graph indicating the frequency characteristics of noises included in a laser light beam, a recording signal, and band-pass filters.

A frequency characteristic of the noise included in the laser light beam is indicated by curve II in FIG. 2. A high frequency noise component extends to about 500 KHz. As the frequency of the noise becomes lower, it drifts and the noise lever becomes larger.

The band-pass filter 28 has a passing band extending between 1 KHz and 1 MHz as indicated by a curve III in FIG. 2. A noise component of relatively high frequency passes out of the noise components. The band-pass filter 34 has a pass band extending between 0.001 Hz and 1 KHz, as indicated by a curve IV in FIG. 2. This filter passes a drift component of relatively low frequency out of the noise components. Since the laser light beam projected to the light detector 33 already contains the information signal component, the upper limit frequency of the passing band of the band-pass filter 34 is selected at 1 KHz, for example. Thus, the information signal component does not pass therethrough.

The radial compensation signal from the variable resistor 25 is also supplied to the adder 29 and added to the noise components from the band-pass filters 28 and 34. An output signal of the adder 29 is supplied to the light modulator 11, through an amplifier 30.

Accordingly, the high frequency noise component is removed from the laser light beam projected into the light modulator 11. The low frequency drift component is removed by the signal which is negative-fed back from the band-pass filters 28 and 34. Therefore laser light beam having no noise component is thus emitted from the light modulator 11. Besides, the energy of the light in the laser light beam from the light modulator 11 decreases gradually as the beam spot position moves over the recording disc 19, from the outer peripheral side to the center. The information signal recorded on the recording disc 19 has a large signal to noise ratio, and a good radial compensation.

In the above described embodiment, the band-pass filter 28 is as selected as to have the frequency characteristic of the passing-band indicated by the curve III in FIG. 2. However, band-pass filter 28 may also have a a pass-band characteristic indicated by a curve V, which covers the characteristics III and IV and passes the entire noise components. In this case, a drift component is produced at the light modulator. The noise components included in the laser light beam at the light modulator 11 are entirely removed. The band-pass filter 34, having the passing-band frequency characteristic IV, is preferably employed to remove this drift component.

FIGS. 3 through 8 respectively show block diagrams of the second through seventh embodiments of the optical recording system of the invention. In FIGS. 3 through 8, those parts which are the same as corresponding parts in the schematic diagrams shown in FIG. 1 are designated by the same reference numerals. The description of such parts is not repeated. These figures show the optical system including lenses, but do not show the mechanism for rotating and moving the recording disc 19.

Figure 3:
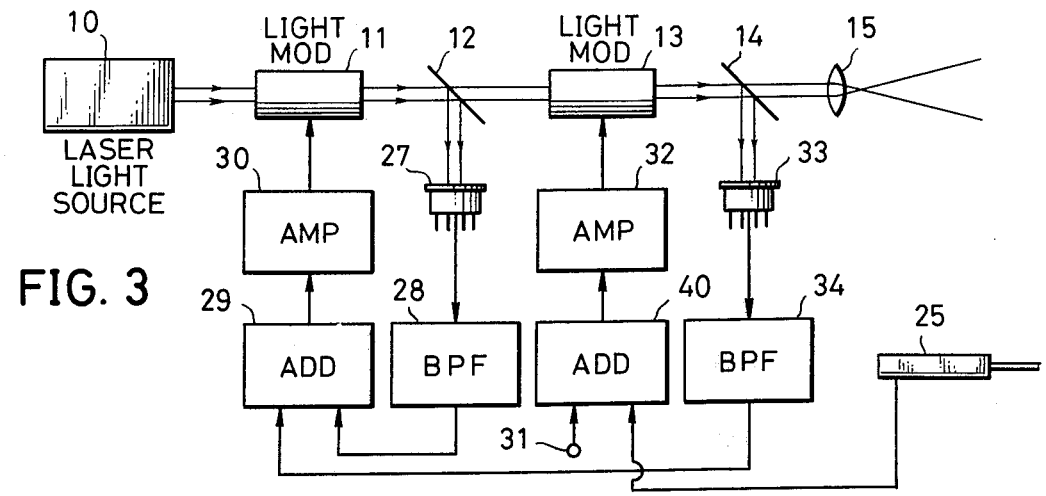
FIG. 3 is a schematic optical and electrical diagram of an essential part of a second embodiment of the optical recording system of the invention.

In a second embodiment of the optical recording system, shown in FIG. 3, the information signal from the input terminal 31 and the radial compensation signal from the variable resistor 25 are added in an adder 40. The output of the adder 40 is supplied to the light modulator 13 via the amplifier 32. The output signals of the band-pass filters 28 and 34 are supplied to the adder 29, in reverse polarity. As a result, the light modulator 11 removes the noise component from the laser light beam, while the light modulator 13 applies the information signal and the radial compensation signal onto the laser light beam. In this embodiment, it is preferable to employ an acousto-optics type light modulator, utilizing an acousto-optic effect as the light modulator 13.

As a modification of the second embodiment, an output signal having an inverted polarity from the band-pass filter 28 and the radial compensation signal from the variable resistor 25 may be supplied to the adder 29. The information signal from the input terminal 31 and an inverted output signal from the band-pass filter 34 may be supplied to the adder 40.

Figure 4:
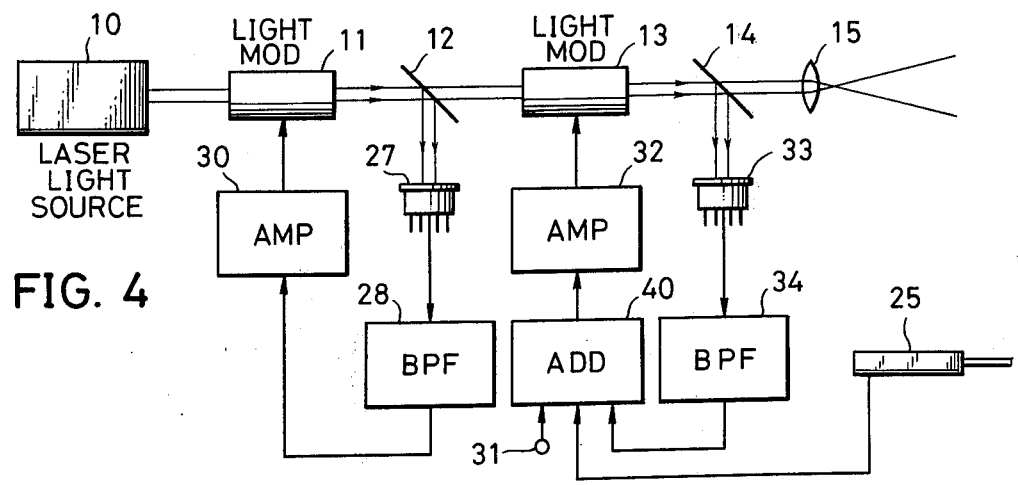
FIG. 4 is a schematic optical and electrical diagram of an essential part of a third embodiment of the optical recording system of the invention.

In the third embodiment shown in FIG. 4, the information signal from the input terminal 31, the radial compensation signal from the variable resistor 25, and the inverted output signal from the band-pass filter 34 are added in the adder 40. The output signal of the adder 40 is supplied to the light modulator 13 via the amplifier 32. The output signal of the band-pass filter 28 is supplied, in inverse polarity, to the light modulator 11 via the amplifier 30. As a result, the light modulator 11 removes at least the high frequency noise component from the laser light beam. The light modulator 13 applies the information signal and the radial compensation signal onto the laser light beam and removes the drift component noise from the laser light beam.

Figure 5:
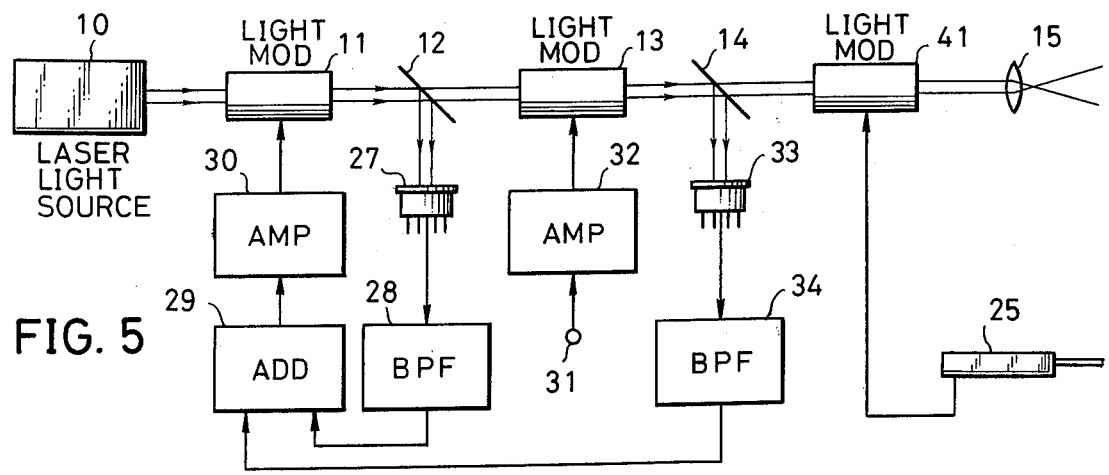
FIG. 5 is a schematic optical and electrical diagram of an essential part of a fourth embodiment of the optical recording system of the invention.

In a fourth embodiment shown in FIG. 5, the output signals of the band-pass filters 28 and 34 are supplied in inverse polarity to the adder 29. A light modulator 41 is in a path of the laser light beam, between the half-mirror 14 and the lens 15. The radial compensation signal from the variable resistor 25 is supplied to the light modulator 41. As a result, the light modulator 11 removes the noise component from the laser light beam. The light modulator 13 applies the information signal onto the laser light beam. The light modulator 41 applies the radial compensation signal onto the laser light beam.

Figure 6:
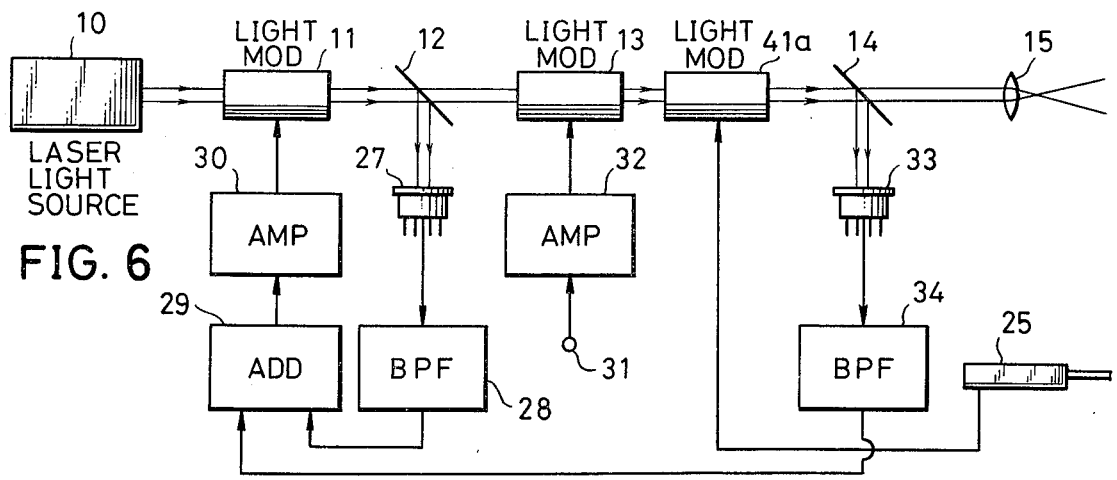
FIG. 6 is a schematic optical and electrical diagram of an essential part of a fifth embodiment of the optical recording system of the invention.

In a fifth embodiment shown in FIG. 6, a light modulator 41a is in a path of the laser light beam, between the light modulator 13 and the half-mirror 14. The light detector 33 detects the intensity of the laser light beam, emitted from the light modulator 41. The outputs of the band-pass filter 29 and 34 are supplied in inverse polarity to the adder 29. The radial compensation signal from the variable resistor 25 is supplied to the light modulator 41a. This fifth embodiment is preferred to the fourth embodiment, because the laser light beam dright component produced at the light modulator 41a is also removed.

Figure 7:
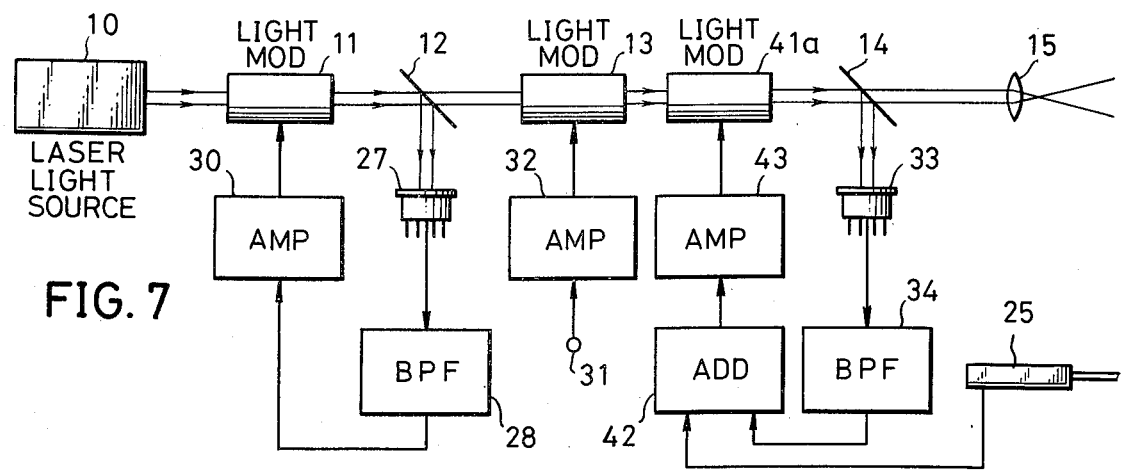
FIG. 7 is a schematic optical and electrical diagram of an essential part of a sixth embodiment of the optical recording system of the invention.
Figure 8:
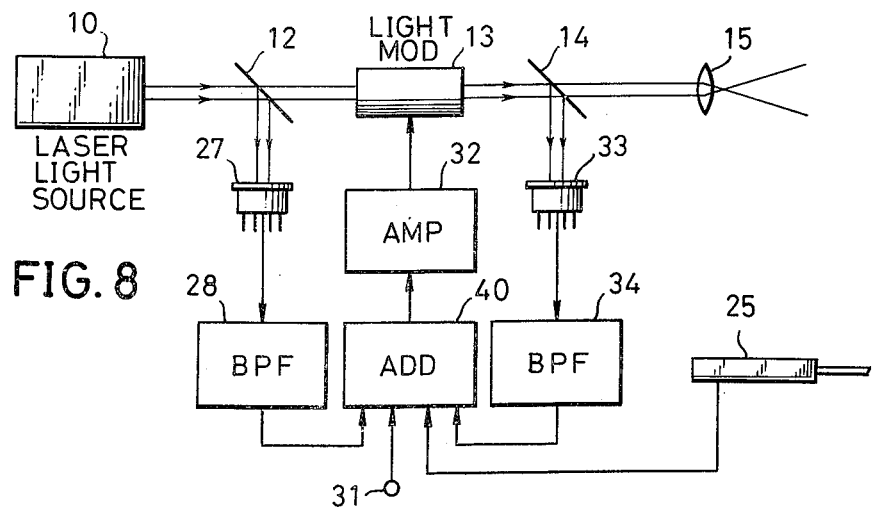
FIG. 8 is a schematic optical and electrical diagram of an essential part of a seventh embodiment of the optical recording system of the invention.

In a sixth embodiment shown in FIG. 7, the output signal of the band-pass filter 28 is supplied in inverse polarity to the light modulator 11 via the amplifier 30. The inverted output signal from the band-pass filter 34 and the radial compensation signal from the variable resistor 25 are added together at an adder 42. The output signal of the adder 42 is supplied to the light modulator 41a via an amplifier 43. As a result, the light modulator 11 removes at least the high frequency noise component from the laser light beam. The light modulator 41a removes the drift component in the leaser light beam and applies a radial compensation signal on the laser light beam.

In the first through sixth embodiments, in order to remove the noise component from the laser light beam, a closed loop is used. The output signal of the light detector varies with, the intensity of the laser light passed through the light modulator, which is negative-fed back to the light modulator via the band-pass filter. However, an open loop may also be employed to remove the noise component, as in a seventh embodiment shown in FIG. 8.

The seventh embodiment (FIG. 8) does not include the light modulator 11, the adder 29, and the amplifier 30 of the second embodiment. The output signal of the band-pass filter 28 is supplied, in inverse polarity, to the adder 40 and is added to the information signal from the input terminal 31, the inverted polarity output signal from the band-pass filter 34, and the radial compensation signal from the variable resistor 25.

This embodiment employs an open loop in which the light modulator 13 removes the high frequency noise component responsive to the noise component detected in the laser light beam before it is projected into the light modulator 13. The noise removing ability of the open loop seventh embodiment is slightly inferior to those of the first through sixth embodiments, employing the closed loop organization. However, according to the present embodiment, the light modulator 11 and the circuit arrangement related thereto such as the adder 29 and amplifier 30 can be omitted. Therefore, the entire system can be made in a simple manner.

In order to make a more simple circuit, a band-pass filter having the band-pass frequency characteristic shown by the curve V in FIG. 2 may be employed instead of the band-pass filter 28. The half-mirror 14, the light detector 33, and the band-pass filter 34 can be omitted. In this case, all noise component removal is carried out by the open loop circuit.

The respective blocks in the diagram of the above described embodiments can be constituted by well-known circuits constructions. The present invention has a novelty in a total system constructed by these blocks. Therefore, the descriptions of circuit which may be used in the respective blocks are omitted.

Further, this invention is not limited to these embodiments but variations and modifications may be made without departing from the scope and spirit of the invention.

What is claimed is:

1. A system for optically recording information signals on a recording medium, comprising:
   a laser beam light source;
   an optical system means including a lens for focusing the laser light beam in a spot on the recording medium;
   first light modulator means for modulating the intensity of the laser light beam responsive to an information signal, the light modulator means being in a light path extending from the light source to the optical system;
   means in the light path for detecting signal noise components in the laser light beam; and
   filter means for removing from the signal the noise components in the laser light beam responsive to an output of the detecting means,
   said optical system means recording the information signal on the recording medium by the laser light beam, in which the noise components have been removed from the signal by the noise component removing means and on which the information signal has been applied by the light modulator.

2. A system for optically recording information signals on a recording medium, comprising:
   a laser beam light source;
   an optical system means including a lens for focusing the laser light beam in a spot on the recording medium;
   first light modulator means for modulating the intensity of the laser light beam responsive to an information signal, the light modulator means being in a light path extending from the light source to the optical system;
   means in the light path for detecting noise components in the laser light beam;
   means for removing the noise components in the laser light beam responsive to an output of the detecting means,
   said optical system means recording the information signal on the recording medium by the laser light beam, in which the noise components have been removed by the noise component removing means and on which the information signal has been applied by the light modulator,
   said noise component detecting means comprising a first means for diverting from the light path a portion of the laser light beam projected into the first light modulator, a first light detector means for detecting the intensity of the laser light diverted by the first diverting means, a first filtering means for filtering at least a high frequency noise component from an output signal of the first light detector means, a second means for diverting from the light path a part of the laser light beam emitted from the first light modulator, a second light detector means for detecting the intensity of the laser light diverted by the second means, and a second filtering means for filtering from the output signal of the second light detector noise components having frequencies which are lower than the frequencies of the information signal; and said noise component removing means comprising a second light modulator in the laser light beam path extending between the light source and the first light modulator.

3. An optical recording system as claimed in claim 2 and means for supplying the outputs of the first and second filtering means to the second light modulator.

4. An optical recording system as claimed in claim 2 and means for supplying the output of the first filtering means to the second light modulator, and means for supplying the output of the second filtering means to the first light modulator.

5. An optical recording system as claimed in claim 2 in which said noise component removing means further comprises a third light modulator means in the light path of the laser light beam extending from the first light modulator to the second diverting means, means for supplying an output of the first filtering means to the second light modulator, and means for supplying an output of the second filtering means to the third light modulator.

6. An optical recording system as claimed in claim 2 which further comprises means for producing a radial compensation signal in response to a position of the laser light beam spot focused on the recording medium by the optical system means, and means for applying the radial compensation signal on the laser light beam emitted from the light source.

7. An optical recording system as claimed in claim 6 in which said applying means comprises means for supplying the radial compensation signal to the second light modulator.

8. An optical recording system as claimed in claim 6 in which said applying means comprises means for supplying the radial compensation signal to the first light modulator.

9. An optical recording system as claimed in claim 6 in which said applying means comprises a third light modulator means in the path of the laser light beam extending from the first light modulator to the optical system means, said third light modulator means being supplied with the radial compensation signal.

10. A system for optically recording information signals on a recording medium, comprising:

a laser beam light source;

an optical system means including a lens for focusing the laser light beam in a spot on the recording medium;

first light modulator means for modulating the intensity of the laser light beam responsive to an information signal, the light modulator means being in a light path extending from the light source to the optical system;

means in the light path for detecting noise components in the laser light beam;

means for removing the noise components in the laser light beam responsive to an output of the detecting means, said optical system means recording the information signal on the recording medium by the laser light beam, in which the noise components have been removed by the noise component removing means and on which the information signal has been applied by the light modulator, said noise component detecting means comprising a first diverting means for diverting from the light path a portion of the laser light beam that is projected into the first light modulator, a first light detector means for detecting the intensity of the laser light diverted by the first diverting means, a first filtering means for filtering at least a high frequency noise component from an output signal of the first light detector, a second diverting means for diverting away from the light path a part of the laser light beam emitted from the first light modulator, a second light detector means for detecting the intensity of the laser light diverted by the second diverting means, and a second filtering means for filtering noise components having frequencies which are lower than the frequencies of the information signal in an output signal of the second light detector; and said noise component removing means comprising means for supplying output signals of the first and second filtering means to the first light modulator.

* * * * *